United States Patent
Schuler

(10) Patent No.: US 11,499,823 B2
(45) Date of Patent: Nov. 15, 2022

(54) METHOD FOR PRODUCING A MEASURING HEAD HOUSING, COVER AND MEASURING HEAD HOUSING

(71) Applicant: Robert Bosch GmbH, Stuttgart (DE)

(72) Inventor: Stefan Schuler, Schonungen (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 17/006,857

(22) Filed: Aug. 30, 2020

(65) Prior Publication Data

US 2021/0088329 A1 Mar. 25, 2021

(30) Foreign Application Priority Data

Sep. 25, 2019 (DE) ..................... 10 2019 214 643.0

(51) Int. Cl.
  *G01B 21/20* (2006.01)
  *B21D 5/00* (2006.01)

(52) U.S. Cl.
  CPC .............. *G01B 21/20* (2013.01); *B21D 5/00* (2013.01)

(58) Field of Classification Search
  CPC .......... G01B 21/20; G01B 21/02; B21D 5/00; G01D 5/24; G01D 5/34753; G01D 11/245; G01D 5/20
  USPC ........................................................ 73/431
  See application file for complete search history.

(56) References Cited

U.S. PATENT DOCUMENTS

| 8,033,859 B2 | 10/2011 | Giefers | |
|---|---|---|---|
| 8,251,589 B2* | 8/2012 | Albert | F16C 29/065 384/8 |
| 2014/0168864 A1* | 6/2014 | Lin | H04M 1/0266 361/679.01 |
| 2019/0027812 A1* | 1/2019 | Kim | H04M 1/18 |
| 2019/0121157 A1* | 4/2019 | Chan | H02K 41/0356 |
| 2019/0132978 A1* | 5/2019 | Lim | H05K 1/111 |

FOREIGN PATENT DOCUMENTS

| DE | 24 60 850 A1 | 7/1975 |
| DE | 24 24 722 A1 | 11/1975 |
| DE | 10 2008 022 312 A1 | 11/2009 |
| EP | 0 726 102 A1 | 8/1996 |
| EP | 0 858 253 A1 | 8/1998 |
| EP | 1 965 178 B1 | 4/2008 |

OTHER PUBLICATIONS

English machine translation for DE 2424722 A1 (Year: 1975).*

* cited by examiner

*Primary Examiner* — Douglas X Rodriguez
*Assistant Examiner* — Byung Ro Lee
(74) *Attorney, Agent, or Firm* — Maginot, Moore & Beck LLP

(57) ABSTRACT

A method for producing a measuring head housing for an integrated measuring system of a linear bearing of a profile rail guide includes providing a cover blank of a flat material with an adhesive layer and bending the cover blank to form a cover. A cover for a measuring head housing and a measuring head housing are also disclosed.

20 Claims, 4 Drawing Sheets

METHOD FOR PRODUCING A MEASURING HEAD HOUSING, COVER AND MEASURING HEAD HOUSING

This application claims priority under 35 U.S.C. § 119 to patent application no. DE 10 2019 214 643.0, filed on Sep. 25, 2019 in Germany, the disclosure of which is incorporated herein by reference in its entirety.

BACKGROUND

The present disclosure relates to a method for producing a measuring head housing according to claim 1 and to a cover for a measuring head housing.

From DE 10 2008 022 312 A1 there is known a scanning device with a measuring head housing which grips in a U-shaped manner around a guide rail. In the scanning assembly there is provided a separate sensor, which is provided for scanning a dimensional standard in order to determine the position of the guide carriage relative to the guide rail. Owing to the arrangement of the scanning device in the measuring head housing, this structure is in principle a so-called integrated measuring system (IMS).

The measuring head housing is thereby so formed that three covers are used in each measuring head housing, namely two lateral covers and an upper cover. In particular in the case of small forms of an IMS, the cover geometry of the upper cover is complicated because a so-called web is not formed in the measuring head housing between the upper and the lateral covers. Accordingly, the upper cover and the lateral cover must interengage directly with one another. Owing to this interengagement between the upper and the lateral covers, a certain minimum thickness of the upper cover is necessary since the covers are bonded together manually. At the same time, the upper cover must be concavely milled on an inner wall for reasons of space. This is complex and expensive. In addition, the sensor can be completely encapsulated with a potting compound of liquid polyurethane resin in order to seal it against process and environmental influences. The covers are then screwed to the measuring head housing.

DE 10 2008 022 312 A1 additionally discloses the provision of a U-shaped cover for a measuring head housing. This cover is connected to the measuring head housing with fastening means via front plates of the measuring head housing. After the cover has been fitted, a potting compound against external influences is injected around an evaluation electronics and sensors in an interior of the measuring head housing, so that fluid-tight termination of those components is ensured.

A disadvantage of the above-mentioned solutions is that the construction of a measuring head housing is very complex, and protection of the vulnerable evaluation electronics and the sensors is effected by a final encapsulation or potting of the interior of the measuring head housing, so that it becomes almost impossible to replace the internal components.

In light of the above, the object of the disclosure is to provide a simplified method for producing a measuring head housing of an integrated measuring system of a profile rail guide. A further object of the disclosure is to provide a cover of simple construction and also a measuring head housing constructed therewith.

SUMMARY

This object is achieved in respect of the method by the feature combination of claim 1 and in respect of the cover for a measuring head housing by the feature combination of the further independent claim 9 and for a measuring head housing by the feature combination of the further independent claim 11.

The method according to the disclosure for producing a measuring head housing, in particular for an integrated measuring system of a profile rail guide, comprises multiple steps. First of all, a substantially planar cover blank is provided. That is to say, the cover blank that is provided is a flat material in the broadest sense. After the cover blank has been positioned, a composition for material-bonded connection, preferably an adhesive, for example in the form of a bead of adhesive, is applied to the cover blank. Application is carried out on an inner side of the cover, which faces towards a measuring head base body. After the composition has been applied, the measuring head base body is placed on the cover blank. Legs located at the end portions of the cover blank are then bent over in such a manner that the composition which has been applied to the cover blank comes into contact with the measuring head base body. A U-shaped cover is thus formed from the cover blank. According to the disclosure, the adhesive is so positioned that it comes into contact with an end plate and a main body of a measuring head base body. The method according to the disclosure thus makes it possible to produce a measuring head housing inexpensively, since a one-piece cover blank, provided in the form of flat material, is shaped into a cover by shaping and, together with the measuring head base body, produces a measuring head housing which is sealed in a process-reliable manner, for example in accordance with protection rating IP67.

Advantageous further developments and improvements of the disclosure are described in the dependent claims.

The cover blank can be produced from an anodized aluminum sheet. Before anodization, it can be a rolled product, an extruded component or a profile body produced in another way.

In a particularly advantageous embodiment of the disclosure, recesses are provided on the side of the cover blank that faces towards the measuring head base body, that is to say on an inner side. These recesses define bending edges/bending lines and facilitate shaping, that is to say bending. The material removal of the recesses is preferably between 25% and 75%, in particular between 40% and 60%, based on the total material thickness of the sheet.

In the region of the legs, further recesses are introduced into the cover blank. These recesses are provided for receiving fastening means. These recesses are preferably free of anodization.

In a preferred embodiment of the disclosure, the composition, preferably the adhesive, applied to the cover blank forms an uninterrupted ring. This is particularly preferably formed as close as possible to edge portions, that is to say longitudinal end faces and bottom edges, of the cover blank. For application of the adhesive, the cover blank is clamped, or held, approximately horizontally on a bending device. The horizontal orientation of the cover blank prevents the composition from running off the cover blank.

It is particularly preferred if the measuring head base body is placed with an upper side on the cover blank. That is to say, according to the previously described orientation of the cover blank, an underside of the measuring head base body faces away from the inner side of the cover blank. The measuring head base body is thus placed upside down on the cover blank.

It is particularly preferred if the cover is formed in one piece.

The method is particularly efficient if it is fully automated so that no manual intervention has to take place. As a result of the simple construction of the measuring head housing and the correspondingly simple method, automation can be implemented particularly easily.

The aluminum sheet from which the cover blank is produced is particularly preferably a flat material. The material thickness can be between 1 mm and 4 mm, in particular between 1.5 mm and 2.5 mm.

A cover according to the disclosure for a measuring head housing for an integrated measuring system of a profile rail guide is electrically contacted with the measuring head base body. Particularly preferably, this electrical contacting takes place via fastening means.

BRIEF DESCRIPTION OF THE DRAWINGS

The disclosure will be explained in greater detail hereinbelow with reference to the accompanying drawings, in which.

DETAILED DESCRIPTION

Figure 1:
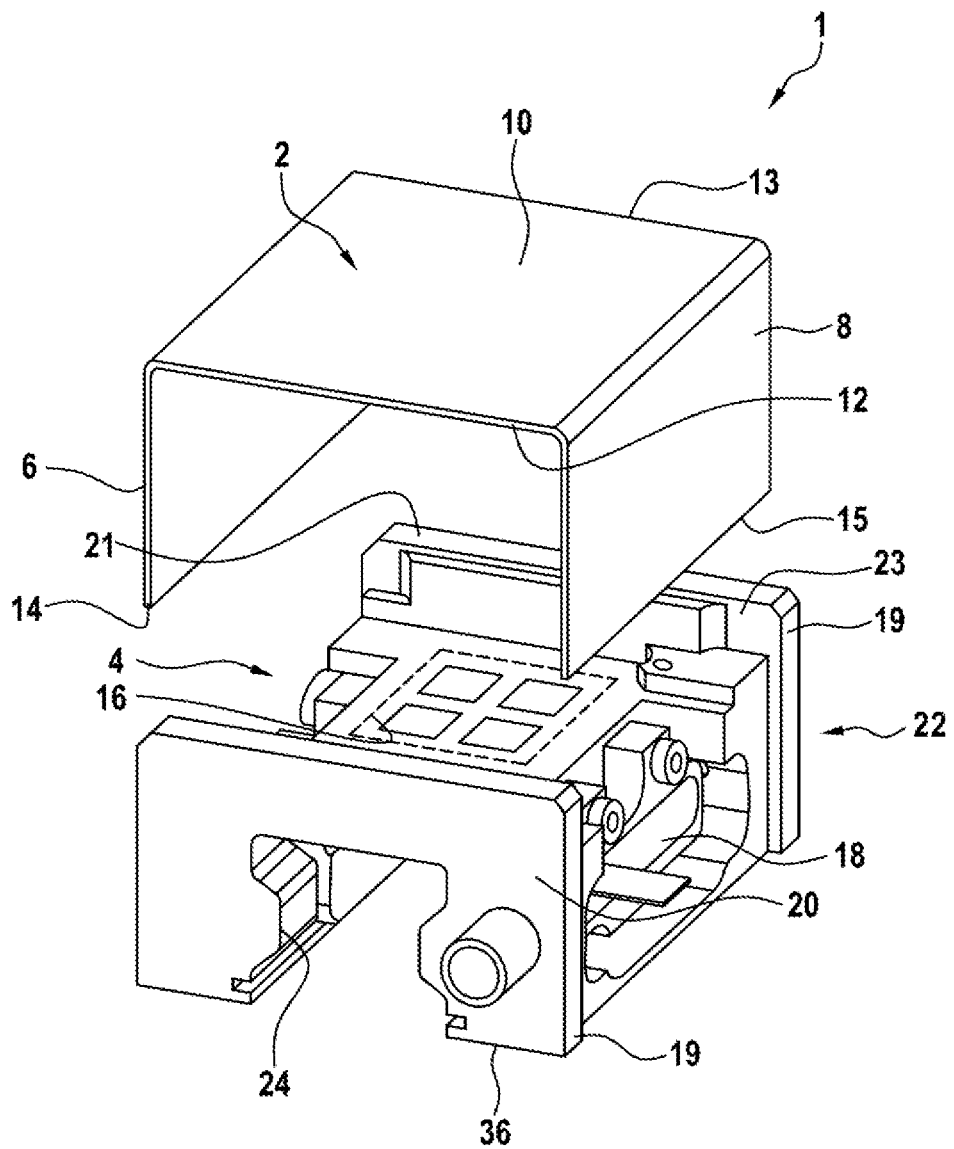
FIG. 1 is a perspective view of an integrated measuring system.

The perspective view of FIG. 1 shows an integrated measuring system (IMS) which is accommodated in a measuring head housing 1 according to the disclosure. Since the fundamental construction of an integrated measuring system, or the functioning thereof, is sufficiently well known from the prior art, it will not be discussed in detail at this point. FIG. 1 is instead intended to illustrate the basic construction of a measuring head housing 1 produced by the method according to the disclosure. Owing to the exploded view chosen here, a cover 2 is shown separately from a measuring head base body 4. The U-shaped cover 2 has two legs 6, 8 which are formed in one piece with a middle portion 10 of the cover 2. The legs 6, 8 extend approximately perpendicularly from an upper side of the middle portion 10. The legs 6, 8 have two longitudinal end faces 12, 13 in common with the middle portion 10, wherein a rear longitudinal end face 13 is formed opposite the other longitudinal end face 12 and is not visible in FIG. 1. The legs 6, 8 each have a bottom edge 14, 15, which bottom edges are directed downwards in the direction towards the measuring head base body 4 in FIG. 1 shown here. An evaluation electronics 16 (shown only schematically here), which is connected to sensors 18, is installed in the measuring head base body 4. The measuring head base body 4 is provided for fastening to a guide carriage of a linear roller bearing. The sensors are formed, for example, according to EP 1965178 B1. The evaluation electronics 16, and also the sensors 18, are thus integrated in the measuring head housing 1. Therefore, this is also referred to as an integrated measuring system. In the direction of movement of the scanning device, the main body 22 is delimited in each case by an end plate 20, 23. Both the main body 22 and the end plates 20, 23 have an inner contour 24 which is configured to move on a guide rail (not shown here). The side of the measuring head base body 4 that faces away from the upper side of the middle portion 10 of the cover 2 and points downwards in FIG. 1 is referred to hereinbelow as the underside 36. The cover 2 of U-shaped form clasps an upper edge 21 and two lateral edges 19 of the end plates 20, 23 and forms therewith the measuring head housing 1. In addition, the cover 2 lies against the main body 22.

Figure 2:
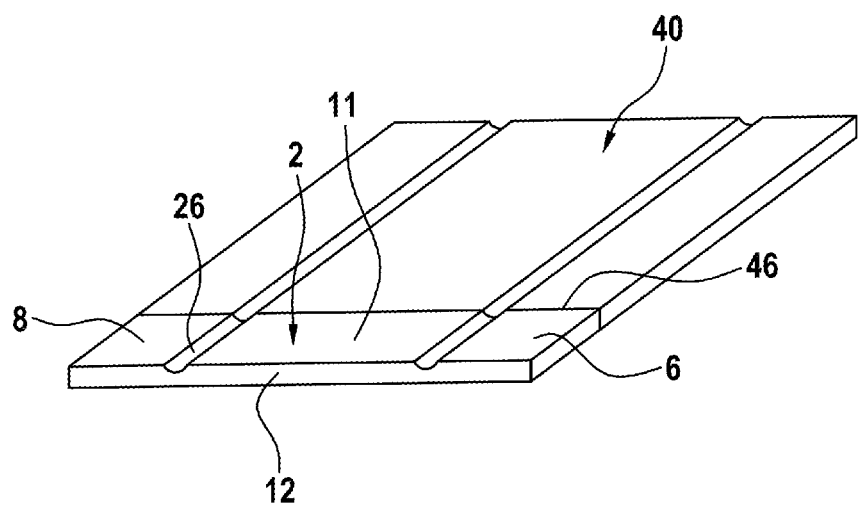
FIG. 2 shows an aluminum sheet and a cover.

FIG. 2 shows a pre-anodized aluminum sheet 40 which serves as the preliminary product for a cover blank from which a cover 2 of a measuring head housing 4 is produced. A cut 46 indicated here is to illustrate that the pre-anodized aluminum sheet 40 can be a flat material which does not yet correspond in terms of its dimensions to those of a final cover 2. Instead, the pre-anodized aluminum sheet 40 is a substantially larger sheet from which the individual cover blanks 2 can be separated as required. This separation can be carried out, for example, in the form of punching, sawing, cutting or a similar method. The pre-anodized aluminum sheet 40 has recesses 26. These recesses 26 can have been introduced into the aluminum sheet 40 both before and after the anodization thereof. It would be conceivable that the aluminum sheet 40 is in the form of an extruded part into which the recesses 26 are already integrated. It would further be possible that the recesses 26 are milled out of the aluminum sheet 40. The recesses 26 form a bending line between the two legs 6, 8 and the middle portion 10 of the cover 2, wherein an inner side 11 of the middle portion 10 of the cover 2 is shown in the perspective view of FIG. 2. It can clearly be seen that the longitudinal end faces 12, 13 are each formed by the cut 46.

Figure 3:
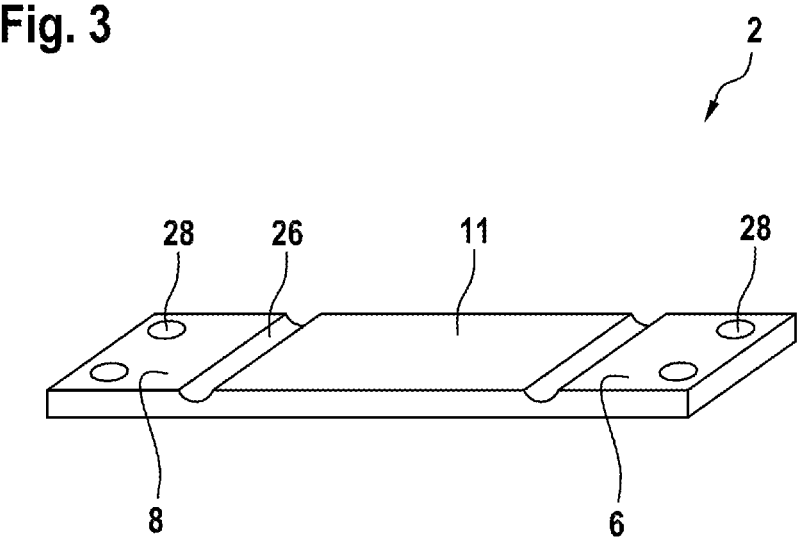
FIG. 3 is a perspective view of a cover.

FIG. 3 shows a cover blank 2 as is provided in the first method step according to the disclosure. The cover blank 2 is thereby largely flat. That is to say, the cover blank 2 is a flat material. It has the recesses 26 already shown before and is additionally provided with bores 28. Neither the recesses 26 nor the bores 28 change the fundamentally planar orientation of the cover blank 2 at all. This planar orientation, or flat orientation, refers to the fact that the legs 6, 8 are formed in a plane with the middle portion 10 of the cover blank 2, the inner side 11 is again visible here. That is to say, there is an angle of 0°, or 180°, between the legs 6, 8 and the middle portion of the cover 2.

Figure 4:
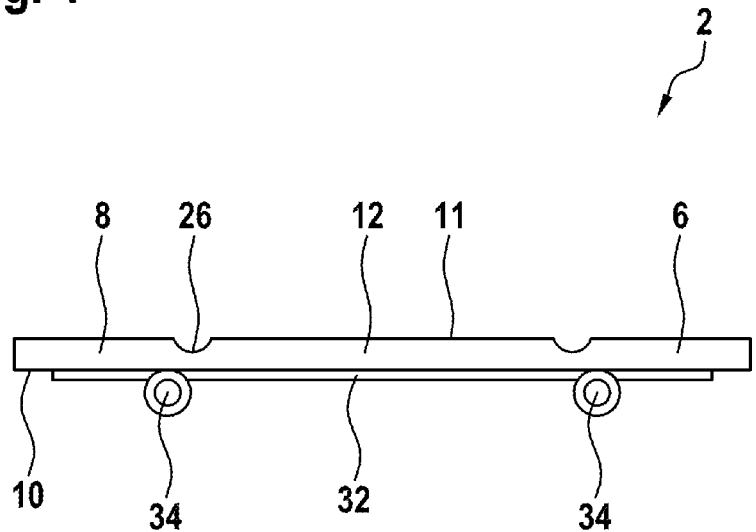
FIG. 4 shows a cover on a bending device in a side view.

A further method step according to the disclosure is shown in FIG. 4. The cover blank 2 is placed on a bending device 32. The upper side 10 of the cover blank 2 lies flat on the bending device 32. The inner side 11 of the cover blank 2 is located on the side of the cover blank 2 that faces away from the bending device 32. The bending device 32 has two hinges 34, which are here shown purely schematically. The hinges 34 are offset slightly relative to the recesses 26.

Figure 5:
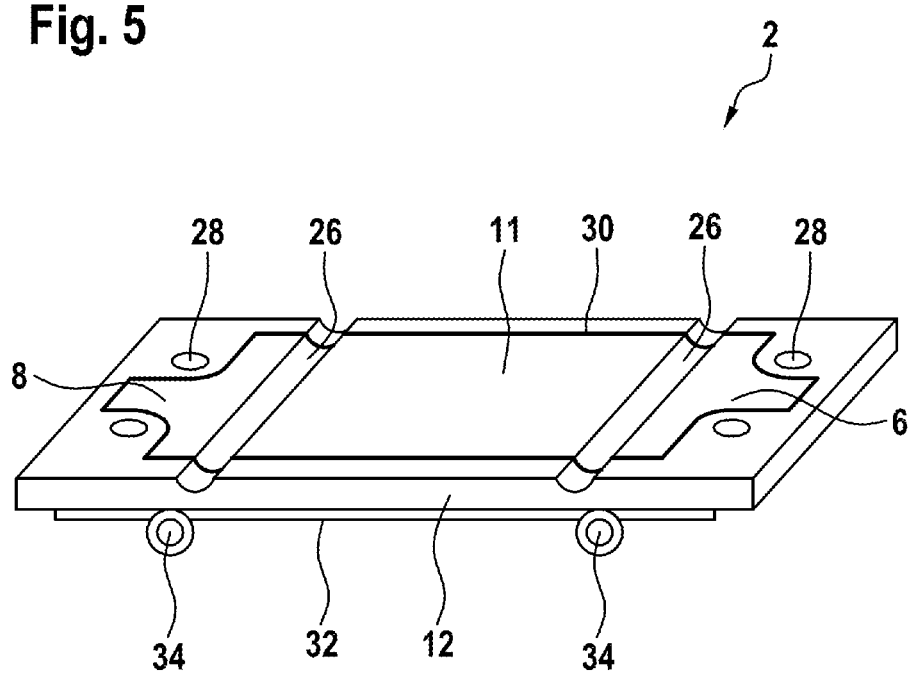
FIG. 5 is a perspective view of a cover on a bending device.

In FIG. 5, the cover blank 2 on the bending device 32 is shown in perspective. An adhesive 30, which is applied to the inner side 11 of the cover blank 2 in a further method step according to the disclosure, is here indicated. As is apparent from the figure, the adhesive 30 is in such a form that it constitutes an uninterrupted ring on the cover blank 2. This uninterrupted ring of adhesive 30 runs on the inner side 11 of the cover blank 2 along the longitudinal end faces 12, 13 and the bottom edges 14, 15. The bores 28 lie outside the ring of adhesive 30, that is to say are not enclosed by the ring of adhesive, and are also not touched thereby. The recesses 26, on the other hand, are filled with adhesive 30.

Figure 6:
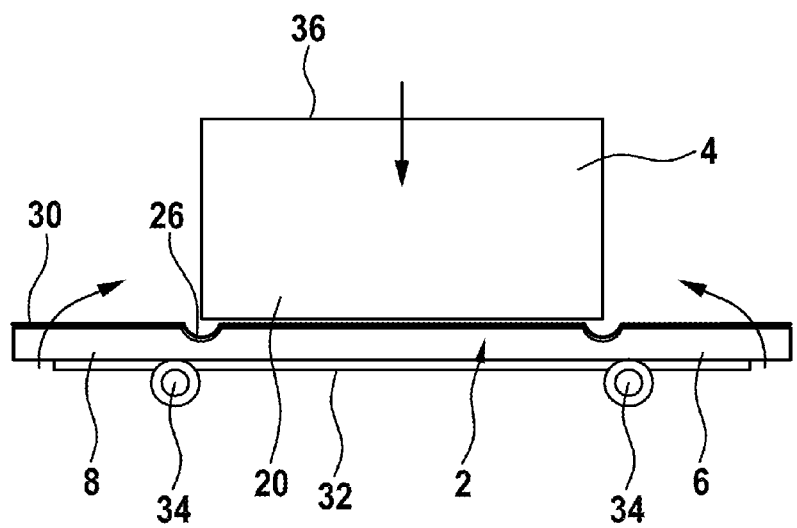
FIG. 6 is a side view of a bending device, a cover and a measuring head base body.

FIG. 6 shows in a highly simplified side view the placing of the measuring head base body 4 on the cover 2. The measuring head base body 4 is thereby placed upside down onto the inner side 11 of the cover blank 2. That is to say, the upper edges 21 of the end plates 20, 23 lie on the cover blank 2. The arrow pointing perpendicularly downwards in the region of the measuring head base body 4 shows the placement direction. When the measuring head base body 4 is placed, it comes into contact with the adhesive 30. The two outer arrows indicate a bending of the cover blank 2. The hinges 34 of the bending device 32 will bend the legs 6, 8 along the recesses 26, which function as predetermined bending points, in the direction towards the measuring head base body 4.

Figure 7:
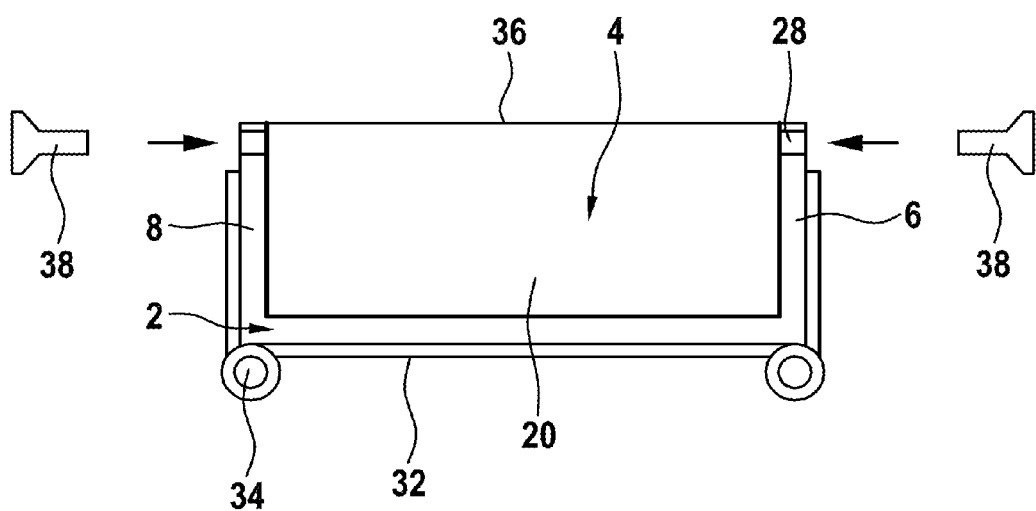
FIG. 7 shows a measuring head housing in a side view, with a cover which has already been bent into the U-shape.

FIG. 7 shows in a side view a measuring head housing 1 which has been produced by the method according to the disclosure. The cover 2 has been bent by the bending device 32 into its end position and is now in its final form as a U-shaped cover 2. That is to say, the legs 6, 8 extend approximately at right angles from the middle portion 10 of the cover 2. The inner sides of the legs 6, 8 are thereby brought into contact with the measuring head base body 4 via the adhesive 30. Apart from the end plates 20, 23 and the underside 36 of the measuring head base body 4, the cover 2 encloses all the previously open sides of the measuring head base body 4. By means of the adhesive 30 applied in the form of a circumferential ring, the cover 2 encloses the measuring head base body 4 in a fluid-tight manner. In order to counteract springing open of the legs 6, 8 after the bending device 32 has been opened, fastening means 38 are introduced through the bores 28 of the cover 2 into the measuring head base body 4 while it is still in the bending device 32. These fastening means 38 can be in the form of, for example, countersunk screws which do not protrude outwards beyond the cover 2, prevent the legs 6, 8 from springing back and at the same time form an electrical contacting between the measuring head base body 4 and the cover 2.

A method for producing a measuring head housing for an integrated measuring system of a linear bearing of a profile rail guide is disclosed, wherein a cover blank of a flat material is provided with an adhesive layer and bent to form a cover. A cover for a measuring head housing and a measuring head housing are also disclosed.

LIST OF REFERENCE NUMERALS 1 measuring head housing
2 cover
4 measuring head base body
6 leg
8 leg
10 middle portion
11 inner side
12 longitudinal end face
13 longitudinal end face
14 bottom edge
15 bottom edge
16 evaluation electronics
18 sensor
19 lateral edge
20 end plate
21 upper edge
22 main body
23 end plate
24 inner contour main body
26 recess
28 bore
30 adhesive
32 bending device
34 hinge
36 underside measuring head base body
38 fastening means
40 pre-anodized aluminum sheet
46 cut

What is claimed is:

1. A method for producing a measuring head housing for an integrated measuring system of a linear bearing of a profile rail guide, comprising:
    applying a composition for material-bonded connection to an inner side of a substantially planar/flat cover blank, the inner side facing towards a measuring head base body, the measuring head base body including a first end plate and a second end plate connected by a main body, each of the first end plate, the second end plate, and the main body defining an inner contour configured to move on a guide rail of the integrated measuring system;
    placing the measuring head base body on the cover blank so that corresponding upper edges of the first end plate and the second end plate are in contact with the composition for material-bonded connection, the cover blank in the substantially planar/flat configuration, wherein the upper edges are located opposite the inner contour; and
    bending legs of the cover blank toward the placed measuring head base body so that the composition for material-bonded connection comes into contact with corresponding lateral edges of the first end plate and the second end plate in a region of the legs and the bent cover blank forms a cover for the measuring head base body, the inner contour located between the lateral edges, and
    wherein the inner contour is exposed for moving on the guide rail.

2. The method according to claim 1, wherein the cover blank is produced from a pre-anodized aluminum sheet.

3. The method according to claim 1, wherein the cover blank has recesses on the inner side facing towards the measuring head base body.

4. The method according to claim 1, further comprising: driving at least one fastening device through bores defined in the region of the legs on both sides and into the lateral edges of the first end plate and the second end plate.

5. The method according to claim 1, wherein the composition for material-bonded connection forms an uninterrupted ring that cannot run off the cover blank owing to the orientation thereof on a bending device.

6. The method according to claim 1, wherein the measuring head base body is placed upside down on the cover blank with the inner contour facing away from the cover blank.

7. The method according to claim 1, wherein the cover blank is formed in one piece.

8. The method according to claim 1, wherein the cover blank is formed of a flat material having a material thickness of from 1 mm to 4 mm.

9. The method according to claim 8, wherein the material thickness of the flat material is from 1.5 mm to 2.5 mm.

10. The method according to claim 1, wherein the composition for material-bonded connection is adhesive.

11. A measuring head housing that is movable on a guide rail, comprising:
    a measuring head base body including a first end plate, a second end plate, and a main body connected to the first end plate and the second end plate, wherein the first end plate, the second end plate, and the main body each define an inner contour configured to move on the guide rail; and a cover that includes (i) a cover blank having an inner side that faces towards the measuring head base body, and (ii) a composition for material-bonded connection applied to a portion of the inner side, wherein the cover blank includes legs that are bent such that the composition for material-bonded connection comes into contact with corresponding lateral edges of the first end plate and the second end plate in a region of the legs, wherein the inner contour is located between the lateral edges, wherein the composition for material-bonded connection also comes into contact with corresponding upper edges of the first end plate and the second end plate, the upper edges located opposite the inner contour, wherein the cover is electrically contacted with the measuring head base body, and wherein the inner contour is exposed for moving on the guide rail.

12. The measuring head housing according to claim 11, wherein the cover blank is produced from a pre-anodized aluminum sheet.

13. The measuring head housing according to claim 11, wherein the cover blank has recesses on the inner side facing towards the measuring head base body.

14. The measuring head housing according to claim 11, further comprising:

at least one fastening device configured to be driven through bores defined in the region of the legs on both sides and into the lateral edges of the first end plate and the second end plate.

15. The measuring head housing according to claim 11, wherein the composition for material-bonded connection forms an uninterrupted ring that cannot run off the cover blank owing to the orientation thereof on a bending device.

16. The measuring head housing according to claim 11, wherein the measuring head base body is placed upside down on the cover blank with the inner contour facing away from the cover blank.

17. The measuring head housing according to claim 11, wherein the cover blank is formed in one piece.

18. The measuring head housing according to claim 11, wherein the cover blank is formed from a flat material having a material thickness of from 1 mm to 4 mm.

19. The measuring head housing according to claim 18, wherein the material thickness of the flat material is from 1.5 mm to 2.5 mm.

20. The measuring head housing according to claim 11, wherein the composition for material-bonded connection is adhesive.

* * * * *